(12) United States Patent
Wellinghoff (10) Patent No.: US 9,600,656 B1
(45) Date of Patent: Mar. 21, 2017

(54) SYSTEM AND METHOD FOR DOMAIN PASSWORD RESET IN A SECURED DISTRIBUTED NETWORK ENVIRONMENT

(71) Applicant: SailPoint Technologies, Inc., Wilmington, DE (US)

(72) Inventor: Nicholas Ryan Wellinghoff, Austin, TX (US)

(73) Assignee: Sailpoint Technologies, Inc., Wilmington, DE (US)

( * ) Notice: Subject to any disclaimer, the term of this patent is extended or adjusted under 35 U.S.C. 154(b) by 0 days.

(21) Appl. No.: 15/065,485

(22) Filed: Mar. 9, 2016

(51) Int. Cl.
H04L 29/06 (2006.01)
G06F 21/45 (2013.01)
H04L 9/14 (2006.01)

(52) U.S. Cl.
CPC ............... G06F 21/45 (2013.01); H04L 9/14 (2013.01)

(58) Field of Classification Search
CPC .................................. G06F 21/45; H04L 9/14
See application file for complete search history.

(56) References Cited

U.S. PATENT DOCUMENTS

| | | | | |
|---|---|---|---|---|
| 2003/0177388 A1* | 9/2003 | Botz | ................... | H04L 63/0807 726/10 |
| 2004/0098609 A1* | 5/2004 | Bracewell | ............. | H04L 63/068 726/6 |
| 2006/0236379 A1* | 10/2006 | Negahdar | ............. | H04L 63/062 726/5 |
| 2010/0281246 A1* | 11/2010 | Bristow | .............. | G06F 11/1425 713/100 |
| 2012/0278732 A1* | 11/2012 | Lee | .......................... | H04L 51/14 715/752 |
| 2013/0111210 A1* | 5/2013 | Ravi | ...................... | G06F 21/316 713/171 |
| 2014/0051422 A1* | 2/2014 | Mittal | .................... | H04W 12/04 455/419 |
| 2014/0229733 A1* | 8/2014 | Henze | ................. | G06F 21/6209 713/168 |

* cited by examiner

*Primary Examiner* — Mohammad A Siddiqi
(74) *Attorney, Agent, or Firm* — Sprinkle IP Law Group (57) ABSTRACT

Embodiments of systems and method as presented herein allow a user's locally stored authentication credentials to be reset without needing either to contact the domain controller over a network or authenticating a user at the device. Credentials being reset by the user are obtained at the device and encrypted in the same manner as the original locally stored domain credentials such that the new credentials can be used to overwrite the previously stored authentication credentials for the user at the device without contacting the domain controller over the network. The user can then access his device without contacting the domain controller using these new locally stored authentication credentials. Additionally, the user's credentials may be independently reset with respect to the domain controller. Thus, once the user is locally authenticated to the device using the new credentials, the user may be permitted access to the domain with the new credentials through the domain controller as the new credentials have been also been reset at the domain controller.

21 Claims, 5 Drawing Sheets

SYSTEM AND METHOD FOR DOMAIN PASSWORD RESET IN A SECURED DISTRIBUTED NETWORK ENVIRONMENT

TECHNICAL FIELD

This disclosure relates generally to systems and methods for security in a distributed networked computer environment. More particularly, this disclosure relates to systems and methods for the management of authentication information in such an environment. Even more particularly, this disclosure relates to the resetting of authentication information in a distributed networked environment.

BACKGROUND

Increasingly, in the computing world, functionality is distributed. Such distribution is achieved through the separation of the devices, functionality or data (collectively resources), and the physical or logical decoupling of such resources. Components implementing various functionality of computer systems may therefore reside in different domains. A domain may include a logical grouping of network objects, such as an internetworked set of computers or applications associated with a particular entity, address, etc. Domains may also encompass a sub-domain, which itself may be a domain contained in the parent domain, etc. Thus, companies or other entities may establish domains for use by their employee or others. In such instances, when a user associated with the entity is provisioned with a computer, a domain administrator may configure the computer or domain such that access to the domain by the computer is accomplished using a set of authentication credentials such as user name and password. When the user's computer has been authenticated with these credentials the user's computer is considered a member of the domain network.

In particular, when a user's computer is a member of a domain these authentication credentials are managed by a computer within the domain. For example, in a Windows domain the computer system that manages such authentication credentials is referred to as a domain controller. This domain controller may only be accessible from a user's computer when the computer has been authenticated by the domain controller and is considered a member of the domain's network. In many cases, however, users travel away from the network and forget their passwords or they expire. If the user is not actively connected to the domain network they may, however, be effectively "locked out" of their computer until they can gain access to the domain network again. This creates a catch-22 situation. The user needs to access the domain controller to reset their credentials for the domain using the domain controller, however, the user can only access the domain controller if the computer has been authenticated by the domain controller using the proper authentication credentials.

Current solutions to this problem rely on the user physically providing their computer or device back to the network of origin (e.g., by mail or courier in the case where the user is located remotely from an administrator or entity). A network administrator for the domain then integrates the computer back into the domain, resets the credentials and physically provides the computer back to the user. This solution is clearly unacceptable, as it is inconvenient for both the user and the administrator and may result in additional security risks when the computer is in transit.

What is desired, then, are systems and methods that provide a secure way to reset domain based authentication credentials in a distributed network environment.

SUMMARY

To address these desires, among others, embodiments as disclosed herein may allow a user's locally stored authentication credentials to be reset without needing either to contact the domain controller over a network or authenticate a user at the device. A user's device may include locally stored authentication credentials that may be used to access a domain. In the event of a connectivity loss or other inability to access the domain controller, or be authenticated to the domain network, these locally stored credentials may be used by the user to access the device. \Mien a user resets his credentials, the credentials being reset by the user are obtained at the device and encrypted in the same manner as the original locally stored domain credentials such that the new credentials can be used to overwrite the previously stored authentication credentials for the user at the device without contacting the domain controller over the network. The user can then access his device without contacting the domain controller using these new locally stored authentication credentials. Additionally, the user's credentials may be independently reset with respect to the domain controller. Thus, once the user is locally authenticated using the new credentials, the user may be permitted access to the domain with the new credentials through the domain controller as the new credentials have been also been reset at the domain controller.

In one embodiment, a computer device for a user may include a processor and a data store. The data store has locally stored authentication credentials comprising one or more entries created in association with a domain controller communicating with the computer device over a network. When a user resets his credentials the user credentials may be obtained at the device. The locally stored authentication credentials can be accessed to determine a current entry in the locally stored authentication credentials associated with the user credential. A new entry associated with the user credential and including the received user credential is created. The current entry in the locally stored authentication credentials is then overwritten with the new entry without contacting the domain controller over the network. By overwriting the current entry with the new entry, a user can be authenticated at the device using the user credential in the new entry of the locally stored authentication credentials without contacting the domain controller over the network. This obtaining, accessing, creating and overwriting may be done, in certain embodiment, without allowing the user to access the computer device.

In particular, in one embodiment, the user credential is in an encrypted format in the current entry and the user credential is in the encrypted format in the new entry.

In one embodiment, a request to update the user's credentials at the domain controller may be sent with the user credential and the user credential is obtained from this request to update the user's credentials at the domain controller.

In another embodiment, one or more keys are used to encrypt the user credential in the new entry. These same keys may be the keys used to decrypt entries of the locally stored authentication credentials to determine if an entry is associated with the user.

Accordingly, embodiments as disclosed herein may have numerous advantages. In particular, they may allow a user to access his device without internet connectivity or contacting a domain controller, even in cases where he has forgotten his credentials or the credentials have expired. The user may thus be prevented from giving up their device or having the device otherwise inaccessible for a period of time. Additionally, because in certain embodiments, no operating system interfaces are utilized to accomplish the reset of the local credentials are used; the solution can be used across many operating systems or versions of a particular operating system.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. As discussed above, in many cases companies or other entities establish a logical grouping of network objects called a domain for the use of people or devices affiliated with the entity. When a user associated with the entity is provisioned with a device a domain administrator may configure the device or domain such that access to the domain by the device is accomplished using a set of authentication credentials such as a user (or account) name or password. These authentication credentials are managed by a computer system within the domain known as a domain controller (it will be understood herein that the term domain controller as used herein refers generally to any computer system that manages authentication credentials and not specifically to a domain controller in a Windows environment). This domain controller may only be accessible from a user's device when the computer has been authenticated by the domain controller and is considered a member of the domain's network.

Provisions may, however, be made to allow a user to access his device in cases where the device is not coupled to the domain network by locally storing authentication credentials on the user's device. In many cases, however, users travel away from the network and forget their credentials, or they expire. While certain password reset functionality may allow a user to reset his credentials remotely, this reset functionality only serves to reset the credentials with respect to the domain controller. Thus while the user's credentials may be reset with respect to the domain controller, the user is still "locked out" of their computer until they can gain access to the domain network again as the locally stored credentials on the user's device have not been updated.

Attention is thus directed to the systems and method as presented herein that allow a user's locally stored authentication credentials to be reset without needing either to contact the domain controller over a network or authenticating a user at the device. Credentials being reset by the user are obtained at the device and encrypted in the same manner as the original locally stored domain credentials such that the new credentials can be used to overwrite the previously stored authentication credentials for the user at the device without contacting the domain controller over the network. The user can then access his device without contacting the domain controller using these new locally stored authentication credentials. Additionally, the user's credentials may be independently reset with respect to the domain controller. Thus, once the user is locally authenticated to the device using the new credentials, the user may be permitted access to the domain with the new credentials through the domain controller as the new credentials have been also been reset at the domain controller.

Figure 1:
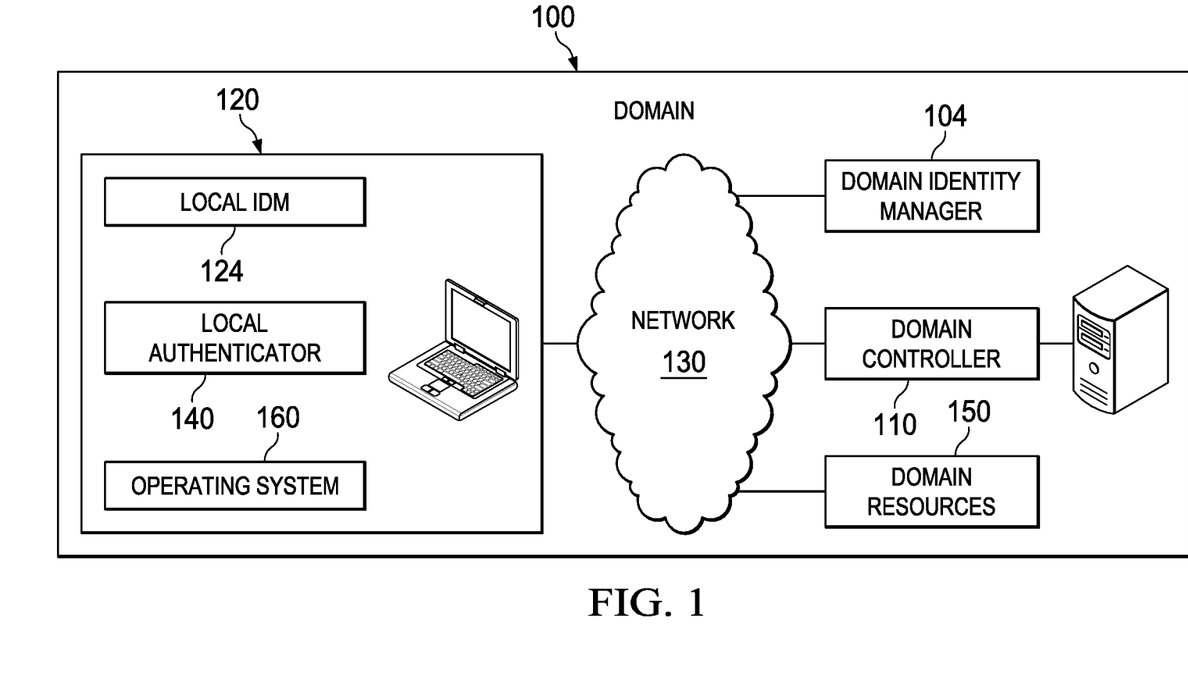
FIG. 1 is a block diagram illustrating one example of a distributed networked computer environment including a domain controller.

FIG. 1 depicts an example distributed computer environment including domain 100 having domain controller 110 for managing authentication credentials for the domain 100. When a user affiliated with the domain 100, such as an employee of a company who established the domain 100 or the like, is given computing device 120 a set of authentication credentials (e.g., username or password) are provisioned by a network administrator for the device 120. In most cases, the user is not given a local account or administrative privileges on the device 120, as it is desirable to restrict the access or control that a user may have on device 120.

When the device 120 is on a network 130 associated with the domain 100, such as a local area network (LAN) or Wide Area Network (WAN) the user may provide the authentication credentials to a local authenticator component 140 associated, for example, with operating system 160 on the device 120. The local authenticator component 140 provides these credentials to the domain controller 110, which authenticates the credentials to determine if they are valid. If the credentials are valid, the device 120 is made a member of the domain 100 and allowed to access the domain resources 150.

In the example depicted here in FIG. 1, if the user on the computing device 120 forgets his authentication credentials (or the credentials are otherwise no longer valid) the computing device on network 130 associated with the domain 100 can contact the domain controller 110 in order to reset the user's authentication credentials and obtain access to the domain 100. In particular, domain 100 may include domain identity manager (IDM) 104 while the device 120 is provisioned with a local identity management component 124. The domain identity manager 104 may for example be the IdentityIQ product by SailPoint Technologies, Inc. of Austin, Tex. The local identity management component 124 may include self-service password reset functionality and be configured to interoperate with the domain identity manager 104. For example, the local identity management component 124 may be a plug-in configured to utilize, interact with, or replace in whole or in part, a Graphical Identification and Authentication (GINA) dynamic-link library (DLL).

Thus, in cases where a user has forgotten his credentials (or the credential is otherwise not valid) the local identity management component 124 may allow the user to access the domain identity manager 104 through the network 130 using an interface. Such an interface may be presented, for example, using a limited functionality browser. Specifically, the local identity management component 124 may contact the domain identity manager 104 and request a credential reset for the user of the device 120. The domain identity manager 104 may reply with a challenge or other verification mechanism. Such a verification mechanism may also be sent to the user through an out-of-band channel such as text message, email, phone call, etc. The user can enter the challenge response and a new credential through the presented interface. The local identity management component 124 sends the challenge response and the new credential to the local identity management component 124. If the challenge response can be validated, domain identity manager 104 may reset the user's credentials using the domain controller 110. The user can then log into the device 120 using the new credential and be validated by the domain controller 110 accessed over the domain network 130.

Figure 2:
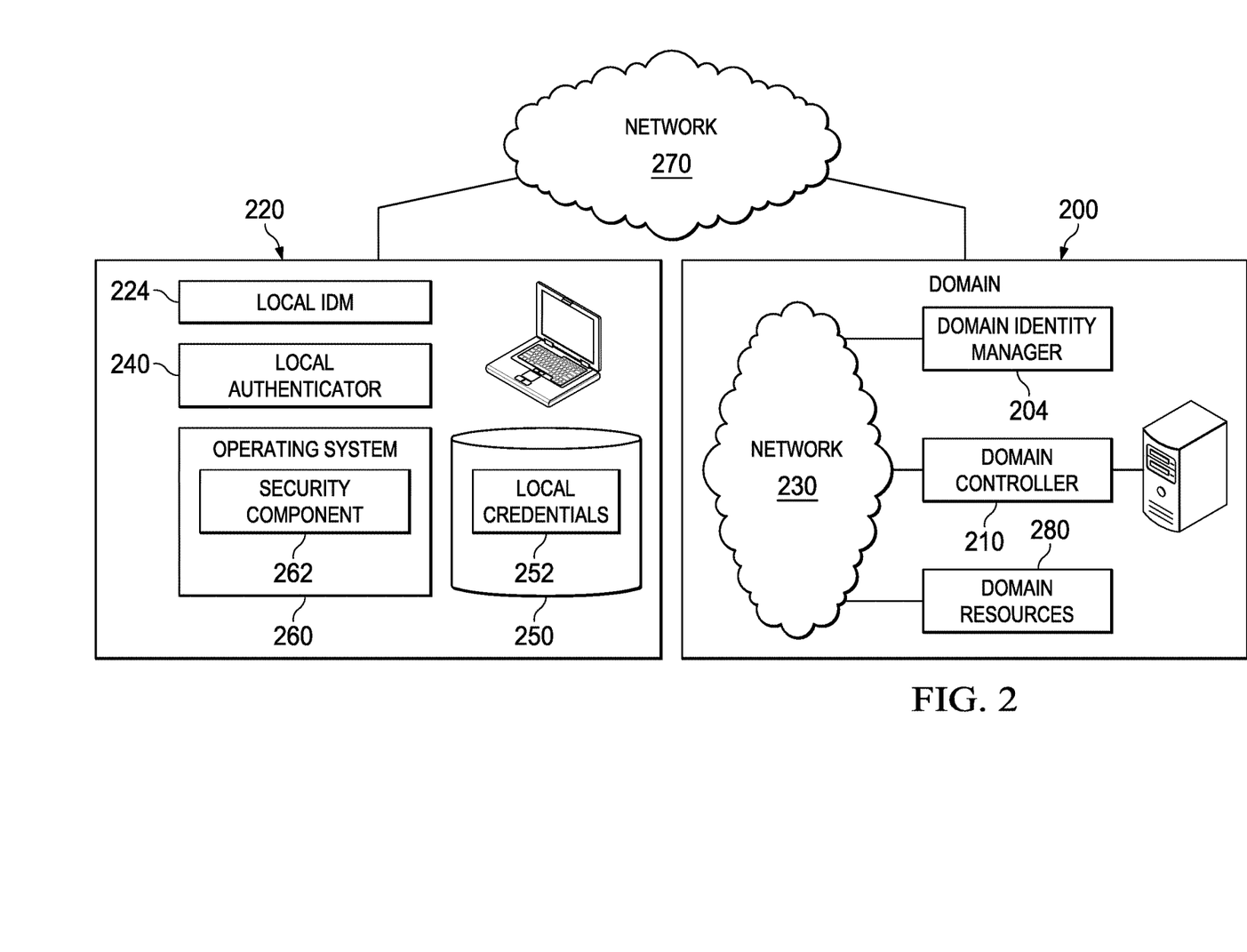
FIG. 2 is a block diagram illustrating one example of a distributed networked computer environment including a domain controller.

Moving now to FIG. 2, in many cases a user may travel with his computing device 220 and not be on network 230 associated with domain 200. For such instances, domain controller 210, in conjunction with local authentication component 240 may provide local cache 250 of authentication credentials 252 for the domain 200. These locally stored credentials 252 are sometimes referred to as domain cached credentials or DCC. This local cache 250 may be in the registry maintained by the operating system 260 of the device 220. Thus, when a user at the device 220 authenticates with the domain controller 210 the domain controller 210 may call one or more procedures provided by operating system 260 of the device 220 to create, update or otherwise synchronize the local authentication credentials 252 associated with users of the device 220 in the local cache 250 with the authentication credentials for the user as stored by domain controller 210.

The procedures provided by the operating system 260 to create, update or synchronize these locally stored authentication credentials 252 may be what are referred to as private interfaces. In other words, the operating system 260 (or makers thereof) may not expose or published the interfaces for these procedures (e.g., may not expose an application programming interface (API) or other type of interface) such that other programs can be made to use these procedures.

To avoid compromising the security of the locally stored authentication credentials 252 and thus the security of the entire domain 200, the authentication credentials 252 in the cache 250 may be hashed, encrypted or otherwise obfuscated using security component 262, which may be provided by the operating system 260. For example, Microsoft provides the MSCache or MSCache v.2 (MSCache2) function that may be used to hash a credential of a user, such as a password. In many instances, the authentication credentials 252 are stored in a "blob" that is a set of bits including a set of associated information stored in particular byte ranges of the set of bits. This information may include, for example, the user's name, a domain name, certain paths or directories associated with the user or the domain, various checksums, etc. In many cases, this blob may have a proprietary format depending on the type or version of operating system 260. Additionally, the blob may be of varying lengths depending on the format utilized for the authentication credentials 252.

In this manner, even when the user cannot access the domain controller 210 the user may access the device 220 using the cache 250 of locally stored authentication credentials 252. Specifically, when the local authentication component 240 receives authentication credentials from the user of the device 220 the local authentication component 240 may determine that it cannot access the domain controller 210, as the domain controller 210 may not be accessible through a public network 270 such as the Internet, a public WAN or LAN, or another public wired or wireless network, etc. The local authentication component 240 may then access the locally stored authentication credentials 252 in the local cache 250 associated with the user and validate the user-entered authentication credentials against the authentication credentials 252 stored in the local cache 250.

In particular, the local authentication component 240 may obtain the local authentication credentials 252 associated with the user if they exist, process the blob to obtain a credential for the user (e.g., the password) and compare the locally stored credentials 252 to the credentials received from the user. It will be noted that what is obtained from the local authentication credentials 252 and compared may be the credential after processing by the security component 262. Thus, the local authentication component 240 may process the credentials received from the user using security component 262 (e.g., MSCache2) and compare the created value (e.g., a hash of the credential received from the user) to the value for the credential obtained from the local authentication credential 252 (e.g., the hashed value of the credential as stored in, or determined from, the cache 250).

If the credentials match, the user may be granted local access to the device 220. A virtual private network (VPN) can then be established over public network 270 between device 220 and domain controller 210 and an attempt can be made to authenticate with the domain controller 210 using the user's credentials. If the user's credentials are authenticated by the domain controller 210 the device 220 may be made a member of the domain 200 through the established VPN and the user can access the domain resources 280 in the domain 200. Additionally, the domain controller 210 may synchronize the locally stored credentials 252 for that user at the device 220.

Now suppose that in such a scenario a user of device 220 forgets his credentials, the credentials have an expiration time associated with them in the local cache 250 such that user's locally stored credentials 252 have expired, or a synchronization between the domain controller 210 and the device 220 has failed or been corrupted. In these circumstances, the user may not be able to access his device 220 as the user may not be able to provide credentials that match the locally stored credentials 252, or the locally stored credentials 252 may not be acceptable as valid to the local authentication component 240. As the user cannot access the device 220, there is likewise no ability to access domain controller 210 to reset the user's credentials. The user may be locked out of his device with no recourse except to return the device to a network administrator of domain 200.

Moreover, as the domain identity manager 204 may also be a member of domain 200 a similar problem may present itself with respect to accessing the domain identity manager 204 to change the user's credentials. Even in the case where the domain identity manager 204 is available from the local identity management component 224, the user may not be able to access his device 220. This situation exists because while the user's credentials may be reset with respect to the domain controller 210, there is no ability for the local credentials 252 to be synchronized as the domain controller 210 cannot access (or be accessed) to reset the local credentials 252 on the device 220.

Figure 3:
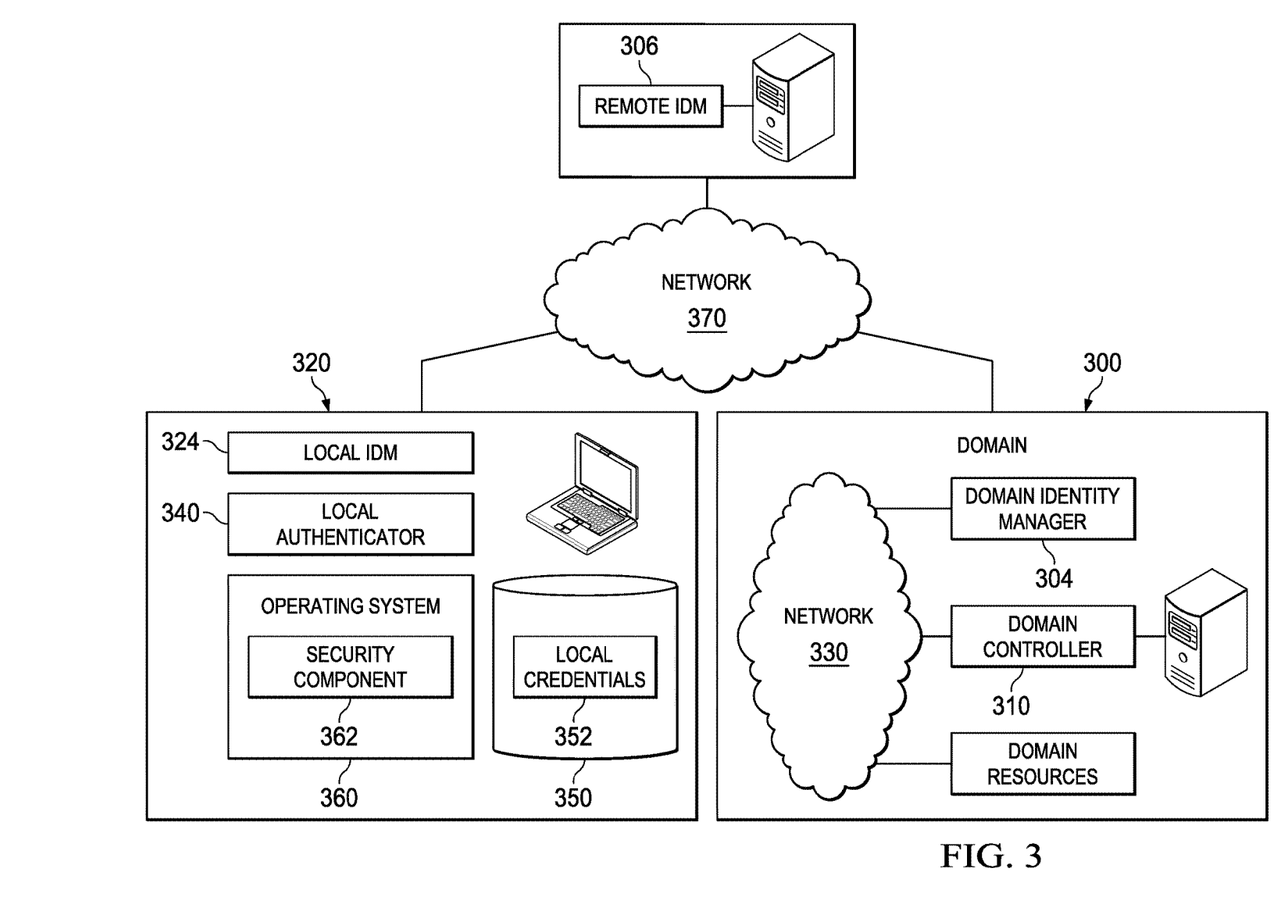
FIG. 3 is a block diagram illustrating one example of a distributed networked computer environment including a domain controller.

This situation may be better illustrated with respect to FIG. 3 which depicts a distributed computer environment including domain 300 having domain controller 310 for managing authentication credentials for the domain 300. In this example, a remote identity manager 306 may be established outside the domain 300. The remote identity manager 306 may be deployed in a standalone computer system or may be deployed in cloud based computer environment. In cloud computing, a cloud refers to a computing platform implemented by a network of distributed servers or the like. Examples of a cloud based computing platform may include, for example, Microsoft Windows Azure, Amazon Elastic Compute Cloud, etc. The remote identity manager 306 may for example be the IdentityNow product by SailPoint Technologies, Inc. of Austin, Tex.

The remote identity manager 306 may provide one or more interfaces accessible through network 370 by local identity manager 324 to accomplish identity management or access functionality. The domain identity manager 304 and the remote identity manager 306 may communicate over network 370 to accomplish the functionality offered through the interfaces of the remote identity manager 306 with respect to the domain controller 310 or other components of the domain 300. The communications between local identity manager 324, remote identity manager 306 and domain identity manager 304 may be accomplished according to one or more protocols such as, for example, Hypertext Transfer Protocol (HTTP), Representational State Transfer (REST), Simple Object Access Protocol (SOAP), etc. and in one or more formats such as, for example, Extensible Markup Language (XML), Hypertext Markup Language (HTML), JavaScript Object Notation (JSON), etc.

Thus, in cases where a user has forgotten his credentials, the credentials have an expiration time associated with them in the local cache 350 such that user's locally stored credentials 352 have expired, or a synchronization between the domain controller 310 and the device 320 has failed or been corrupted. In these circumstances, the user may not be able to access his device 320 as the user may not be able to provide credentials that match the locally stored credentials 352, or the locally stored credentials 352 may not be acceptable as valid to the local authentication component 340. Here, the user may utilize local identity management component 324 that includes self-service password reset functionality that is configured to communicate with remote identity manager 306 to request a reset of the user credentials.

Specifically, the local identity management component 324 may present an interface to allow the user to request a reset of his credentials. Such an interface may be presented, for example, using a limited functionality browser. The local identity management component 324 may contact the remote identity manager 306 over network 370 using an interface offered by the remote identity manager 306 and request a credential reset for the user of the device 320. The remote identity manager 306 may reply with a challenge or other verification mechanism. Such a verification mechanism may also be sent to the user through an out-of-band channel such as text message, email, phone call, etc. The user can enter the challenge response and a new credential through the presented interface at the device 320. The local identity management component 324 sends the challenge response and the new credential to the remote identity manager 306. If the challenge response can be validated, remote identity manager 306 may reset the user's credentials by communicating with the domain identity manager 304. The domain identity manager 304 then effectuates the resetting of the user's credentials by communicating with the domain controller 310.

The user's credentials have thus been reset with respect to the domain controller 310. As the domain controller 310 does not present an interface accessible outside the domain 300, however, this may not alleviate the user's access problem with respect to device 320. The device 320 still remains unavailable to the user because the local credentials 352 of the user on the device 320 have not been similarly reset. Thus, when the local authentication component 340 receives authentication credentials from the user of the device 320 the local authentication component 340 may determine that it cannot access the domain controller 310, as the domain controller 210 may not be accessible through a public network 370. The local authentication component 340 may then access the locally stored authentication credentials 352 in the local cache 250 associated with the user and attempt to validate the user entered authentication credentials against the authentication credentials 352 stored in the local cache 350. Because the domain controller 310 cannot communicate over the public network 370 to synchronize the local authentication credentials 352 stored in the device 320 with the new credentials as reset by the user on the domain controller 310, the attempted validation of the user entered credentials (e.g., the user's new credentials) against the local stored authentication credentials 352 will fail and the user denied access to the device 320.

It is thus desirable to allow a user to gain access to his device in cases when the user is located outside a domain without valid credentials. Embodiments as disclosed herein may provide an agent or other component residing on the user's device that obtain new credentials for the user, access the locally stored authentication credentials for the user on the device, modify the authentication credentials with the new and replace the locally stored authentication credentials for the user with the new credentials. The component may integrate with the domain credential reset functionality present on the device such that the locally stored authentication credentials are updated at the same time the user's authentication credentials are updated at the domain controller. When the user next attempts to access the device using the new authentication credentials the user may be validated against the updated locally stored authentication credentials and allowed to access the device on that basis.

Figure 4:
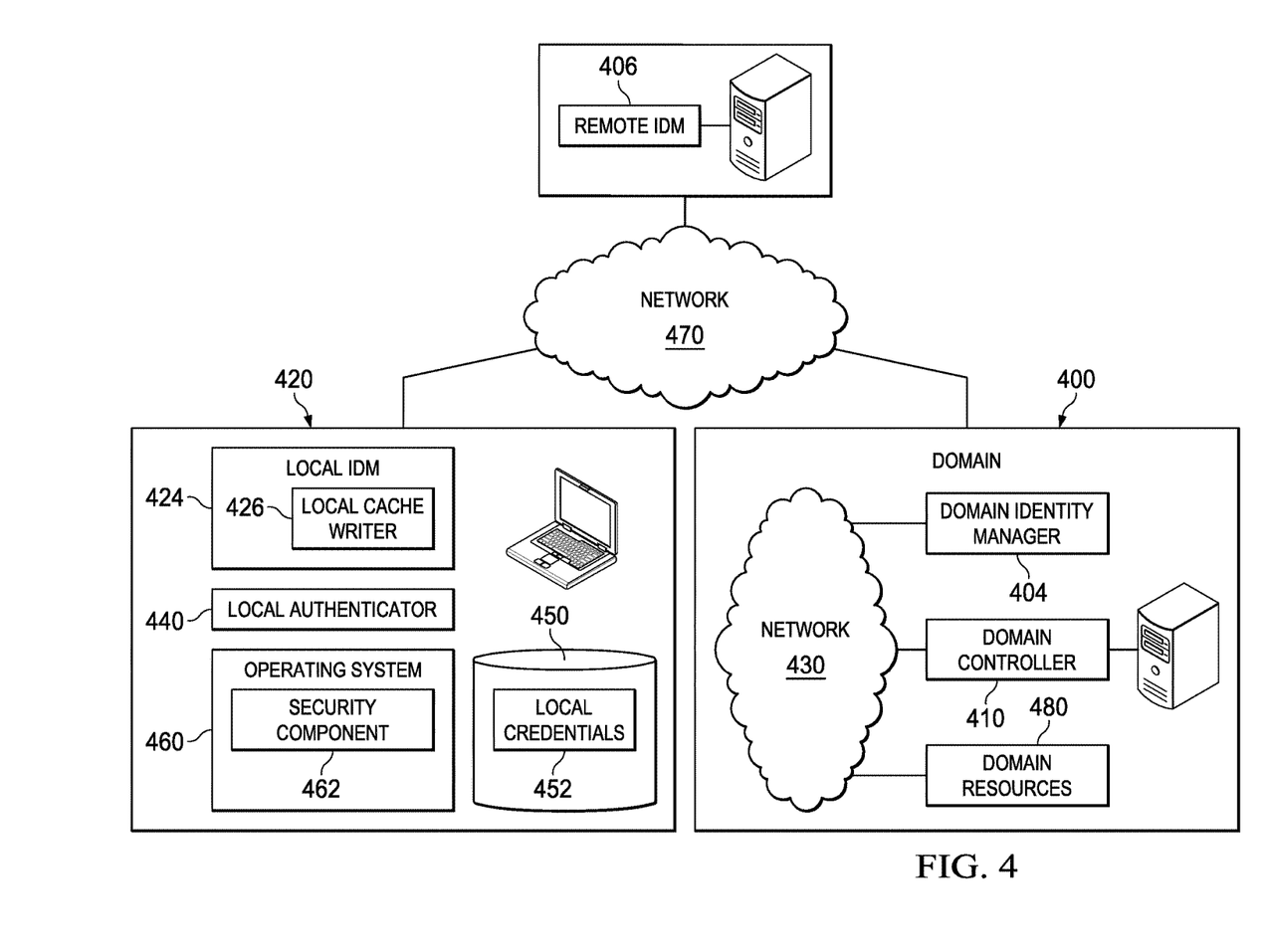
FIG. 4 is a block diagram illustrating one embodiment of a distributed networked computer environment including a domain controller.

Turning now to FIG. 4, one embodiment of a distributed computer network environment including domain 400 having domain controller 410 for managing authentication credentials for the domain 400 is depicted. Domain 400 may utilize an identity management system comprising a local identity manager 424 on a user's device 420, domain identity manager 404 inside domain 400 and remote identity manager 406 outside the domain 400.

The domain identity manager 404 may have access to, or credentials for, domain controller 410 and be configured to request that functionality be performed by the domain controller 410 through one or more interfaces offered by the domain controller 410. The domain identity manager 404 may be, for example, the IdentityIQ product by SailPoint Technologies, Inc. of Austin, Tex.

Remote identity manager 406 may be deployed in a standalone computer system or may be deployed in cloud based computer environment such as, for example, Microsoft Windows Azure, Amazon Elastic Compute Cloud, or the like. Remote identity manager 406 may provide one or more interfaces accessible through network 470 to accomplish identity management or access functionality. The remote identity manager 406 may for example be the IdentityNow product by SailPoint Technologies, Inc. of Austin, Tex.

The domain identity manager 404 and the remote identity manager 406 may communicate over network 470 to accomplish the functionality offered through the interfaces of the remote identity manager 406 with respect to the domain controller 410 or other components of the domain 400. In particular, remote identity manager 406 may receive requests associated with offered functionality through one or more interfaces provided by the remote identity manager 406. In one embodiment, as domain identity manager 404 may be within domain 400 it may not be configured to accept requests or other communications originating from outside domain 400. Therefore, to effect communication with the domain identity manager 404 the remote identity manager 406 may place items or "jobs" on a work queue maintained by the remote identity manager 406. At some interval the domain identity manager 404 may send a request for work items to the remote identity manager 406. The remote identity manager 406 may respond to the request for work items from the domain identity manager 404 with one or more work items from the work queue, if any work items exist on the queue. As the response from remote identity manager 406 has been sent in response to a request initiated by the domain identity manager 404, it may be allowed into domain 400 and received at domain identity manager 404. The domain identity manager 404 may then perform each of the work items received from the remote identity manager 406, utilizing the domain controller 410 when needed to accomplish a received work item.

Local identity manager 424 on the user's device 420 may have been installed, or otherwise provisioned, on the user's device 420 by a network administrator of the domain 400. The local identity manager 424 may have been given SYSTEM or administrator level access to the device 420 such that the local identity manger 424 may access the registry of the operating system 460 on the device 420. The local identity management component 424 may include self-service password reset functionality and be configured to send requests associated with this self-service password reset functionality to the remote identity manager 406 according to the interfaces provided by the remote identity manager 406. For example, the local identity management component 424 may be a plug-in configured to utilize, interact with, or replace in whole or in part, a Graphical Identification and Authentication (GINA) dynamic-link library (DLL).

The communications between local identity manager 424, remote identity manager 406 and domain identity manager 404 may be accomplished according to one or more protocols such as, for example, Hypertext Transfer Protocol (HTTP), Representational State Transfer (REST), Simple Object Access Protocol (SOAP) or the like, and in one or more formats such as, for example, Extensible Markup Language (XML), Hypertext Markup Language (HTML), JavaScript Object Notation (JSON) or the like. Accordingly, certain security measures such as encryption or the like may be taken with respect to communications occurring between local identity manager 424, remote identity manager 406 or domain identity manager 404. Embodiments of such authentication and communications are, for example, described in U.S. patent application Ser. No. 14/318,133, filed on Jun. 27, 2014, by Forster et al., entitled "System and Method For Securing Authentication Information In A Networked Environment", which is fully incorporated herein for all purposes.

When a user affiliated with the domain 400, such as an employee of a company who established the domain 400 or the like, is given computing device 420 a set of authentication credentials (e.g., username or password) are provisioned by a network administrator of the domain 400 for the user or device 420. In most cases, the user is not given a local account or administrative privileges on the device 420, as it is desirable to restrict the access or control that a user may have on device 420. A set of identity verification data (e.g., a challenge and response) for use in verifying a user may also be obtained from the user and stored at one or more of domain controller 410, domain identity manager 404 or remote identity manager 406.

In a normal authentication procedure, a user may authenticate with domain controller 410 using local authenticator component 440, or local identity manager 424, and remote identity manager 406. For example, when the device 420 is on a network 430 associated with the domain 400, the user may provide his authentication credentials to a local authenticator component 440 associated, for example, with operating system 460 on the device 420. The local authenticator component 440 provides these credentials to the domain controller 410, which determines if these credentials are valid. If the credentials are valid, the device 420 is made a member of the domain 400 and allowed to access the domain resources 480.

For a variety of reasons, it is desirable to allow the user to access the device 420 when he is outside of domain 400. Accordingly, when the user is authenticated with the domain controller 410 the domain controller 410 may call one or more procedures provided by operating system 460 of the device 420 to create, update or otherwise synchronize local authentication credentials 452 associated with users of the device 420 in the local cache 450 with the authentication credentials for the user as stored by domain controller 410. The local cache 450 may be, for example the registry for the operating system 460 of the device 420. The procedures provided by the operating system 460 to create, update or synchronize these locally stored authentication credentials 452 may be what are referred to as private interfaces. In other words, the operating system 460 (or makers thereof) may not expose or published the interfaces for these procedures (e.g., may not expose an application programming interface (API) or other type of interface) such that other programs can be made to use these procedures.

To avoid compromising the security of the locally stored authentication credentials 452, and thus the security of the entire domain 400, the authentication credentials 452 in the cache 450 may be hashed, encrypted or otherwise obfuscated using security component 462, which may be provided by the operating system 460. For example, Microsoft provides the MSCache or MSCache v.2 (MSCache2) function which may be used to hash a credential of a user, such as a password. In many instances, the authentication credentials 452 are stored in an entry or "blob" that is a set of bits having a set of associated information stored in particular byte ranges of the set of bits. This information may include, for example, the user's password in a hashed or encrypted form, the user's (or account) name, a domain name, certain paths or directories associated with the user or the domain, various checksums, etc. In many cases, this blob may have a proprietary format depending on the type or version of operating system 460. Additionally, the blob may be of varying lengths depending on the format utilized for the authentication credentials 452.

In this manner, even when the user cannot access the domain controller 410 the user may access the device 420 using the cache 450 of locally stored authentication credentials 452. Specifically, when the local authentication component 440 receives authentication credentials from the user of the device 420 the local authentication component 440 may determine that it cannot access the domain controller 410, as the domain controller 410 may not be accessible through a public network 470. The local authentication component 440 may then access the locally stored authentication credentials 452 in the local cache 450 associated with the user and validate the user-entered authentication credentials against the authentication credentials 452 stored in the local cache 450.

In particular, the local authentication component 440 may obtain the local authentication credentials 452 associated with the user if they exist, process the entry associated with the user to obtain a credential for the user (e.g., the password) and compare the credential for the user to the credential received from the user. It will be noted that what is obtained from the local authentication credentials 452 and compared may be the credential after processing by the security component 462. Thus, the local authentication component 440 may process the credential received from the user using security component 462 (e.g., MSCache2) and compare the created value (e.g., a hash of the credential received from the user) to the value for the credential obtained from the local authentication credential 452 (e.g., the hashed value of the credential as stored in, or determined from, the entry in local authentication credentials 452 associated with the user).

If the credentials match, the user may be granted local access to the device 420. A virtual private network (VPN) can then be established over public network 470 between device 420 and domain controller 410 and an attempt can be made to authenticate with the domain controller 410 using the user's credentials. If the user's credentials are authenticated by the domain controller 410 the device 420 may be made a member of the domain 400 through the established VPN and the user can access the domain resources 480 in the domain 400. Additionally, the domain controller 410 may synchronize the locally stored credentials 452 for that user at the device 420.

Now suppose that a user of device 420 forgets his credentials, the user's credentials 452 have an expiration time associated with them in the local cache 450 such that the user's locally stored credentials 452 have expired, or a synchronization between the domain controller 410 and the device 420 has failed or been corrupted such the local authentication credentials 452 for the user have become invalid. In these circumstances, the user may not be able to access his device 420 as the user may not be able to provide credentials that match the locally stored credentials 452, or the locally stored credentials 452 may not be acceptable as valid to the local authentication component 440. As the user cannot access the device 420, there is likewise no ability to access domain controller 410 to reset the user's credentials.

In cases where a user has forgotten his credentials (or the credential is otherwise not valid), the local identity management component 424 may allow the user to access the remote identity manager 406 to reset his credentials through the network 470 using an interface. Such an interface may be presented by local identity management component 424 using, for example, a secure browser (which may have a restricted set of functionality compared to a typical web browser or the like) when a user requests credential reset functionality from a login screen or the like. The local identity management component 424 may contact the remote identity manager 406 over network 470 using an interface offered by the remote identity manager 406 and request a credential reset for the user of the device 420. The remote identity manager 406 may reply with a challenge or other verification mechanism which can be presented to the user through the interface. Such a verification mechanism may also be sent to the user through an out-of-band channel such as text message, email, phone call, etc. The user can enter a challenge response and a new credential (e.g., user or account name or password) through the presented interface at the device 420. The local identity management component 424 sends the challenge response and the new credential to the remote identity manager 406. If the challenge response can be validated, remote identity manager 406 may reset the user's credentials by communicating the new user credentials and a request to reset the user's credentials to the domain identity manager 404. The domain identity manager 404 then effectuates the resetting of the user's credentials on the domain controller 410 by communicating with the domain controller 410. The user's credentials may thus be reset with respect to the domain controller 410.

Local identity manager 424 may also contain local cache writer module 426. The local cache writer module 426 may be configured to overwrite the user's local credentials 452 as stored in the cache 450 with the user's new credentials without access to the domain 400 or domain controller 410, allowing a user to access the device 420 using these new credentials without these local credentials 452 being reset by the domain controller 410, identify manager 404 or remote identity manager 406.

In particular, the local cache writer 426 can also obtain the user's new credentials. These new user credentials may be passed to the local cache writer 426 by local identity manager 424. In one embodiment, local cache writer 426 may be integrated with the browser provided by the local identity manager 424 and may observe the communications for resetting the credentials between the local identity manager 424 and the remote identity manager 406 to obtain the new user credentials from these communications. In another embodiment, during the credential reset process that occurs between the local identity manager 424 and the remote identity manager 406 the remote identity manager 406 may set a cookie with the new user's credentials on the device 420 using the browser functionality provided by the local identity manager 424. Local cache writer 426 may obtain the new user credentials by reading such a cookie. Subsequently to obtaining the new credentials the local cache writer 426 may remove the cookie.

Once the user's new credentials are obtained, the local cache writer 426 may obtain the user's locally cached authentication credentials 452 stored in the local cache 450 as stored by the operating system 460. For example, the Windows operating system stores cached domain credential information in the HKLM\Security\Cache registry. This data may only be visible to processes running with SYSTEM level credentials. The local authentication credentials 452 may contain multiple entries (e.g., for example 10 in certain cases) where each entry may pertain to a different user who has accessed the domain 400 using their credentials from the device 420. AS discussed, in some instances the authentication credentials 452 are stored in an entry or blob.

In particular, each blob may contain an encrypted version of a user's credential (e.g., password) after processing by security component 462. For example, the blob for a user may contain an encrypted version of the 16 byte hash value created by the MSCache2 procedure in a Windows environment. In one particular embodiment the blob may take the following format, where information in brackets comprises a number describing the byte index or range of the blob followed by a description of the data contained in those bytes: [0 userNameLength][2 domainNameLength][4 effectiveNameLength][6 fullNameLength][8 logonScriptLength][10 profilePathLength][12 homeDirectoryLength][14 homeDirectoryDriveLength][16 . . . 23 last login/unknown][24 . . . 27 groupCount][28 logonDomainNameLength][29 . . . 59 unknown][60 dnsDomainNameLength][62 upnLength][64 . . . 79 AES CBC IV][80 . . . 95 Checksum][96 . . . 111 encrypted 16 byte MSCache2 password hash][112 . . . n rest of encrypted domain data with positions derived from header values].

In the above embodiment of a blob, bytes 96 through the length of the blob are the encrypted data that contain the user's password and other account information such as the domain data or other account credentials such as the user (or account) name. The data may be encrypted with Advanced Encryption Standard (AES) Cipher Block Chaining (CBC) cipher where the Initialization Vector (IV) is from the header and the key is the first 16 bytes of an cache key such as NL$KM in Windows. The first 16 bytes of the decrypted data is the hash of a user's password as created by the MSCache2 security component. The rest of the information can be derived using the offsets described in the blob header starting from position 72 in the byte array of the blob.

To overwrite the entry in the local authentication credentials 452 associated with the user, then, in certain embodiments the local cache writer 426 obtains the cache key used to encrypt the data contained in the blob. These keys may be, or may be derived from, a system (e.g., operating system 460) key or a local security related key. For example, in one embodiment, a Windows System key (e.g., syskey) used by the Windows operating system to protect secure information stored locally on the device 420 may be obtained. This key may be a 128-bit Rivest Cipher 4 (RC4) encryption key. This system key may be derived by using key metadata from the following keys: SYSTEM\\CurrentControlSet\\Control\\Lsa","JD"; SYSTEM\\CurrentControlSet\\Control\\Lsa","Skew1"; SYSTEM\\CurrentControlSet\\Control\\Lsa","GBG"; and SYSTEM\\CurrentControlSet\\Control\\Lsa","Data".

The local cache writer 426 may also obtain a local security authority key. This key may be a key used to protect a process for domain authentication such as local authenticator 440. For example, in one embodiment, with respect to the Windows operating system a Local Security Authority (LSA) key used to protect the lsass.exe process may be obtained. In one embodiment, the LSA key may be obtained by reading the SECURITY\\Policy\\PolEKList registry value. Bytes 60 through total length −60 of this registry value can be read to obtain ciphered data. Bytes 28 through total length −28 of this ciphered data can be read to obtain a ciphered hash. A cipher key can be generated by generating a Secure Hash Algorithm (SHA) 256 bit hash using the obtained system key as an initialization value and applying one or more iterations of the SHA 256 transform. The ciphered data can be decrypted with AES Electronic Code Book (ECB) using the generated cipher key. The 32 bytes starting from the 68$^{th}$ byte of the array resulting from this decryption is the LSA key.

The cache key used to encrypt the user credentials in the local authentication credentials 452 can then be derived using the system key and the local security authority key. In one embodiment, the cache key (e.g., NL$KM) may be obtained by reading the SECURITY\\Policy\\Secrets\\NL$KM\\CurrVal registry value. Bytes 60 through total length −60 of this registry value can be read to obtain ciphered data. Bytes 28 through total length −28 of this ciphered data can be read to obtain a ciphered hash. A cipher key can be generated by generating a Secure Hash Algorithm (SHA) 256 bit hash using the obtained local security authority key as an initialization value and applying one or more iterations of the SHA 256 transform. The ciphered data can be decrypted with AES Electronic Code Book (ECB) using the generated cipher key. The 64 bytes starting from the 16$^{th}$ byte of the array resulting from this decryption is the NL$KM key.

Once the cache key is determined, it can be used to decrypt each of the entries (e.g., blobs) or portions thereof, such as the encrypted password hash or encrypted domain or account data. In one embodiment, for example, bytes 96 onward of an entry in local credentials 452 of cache 450 may be decrypted to obtain domain or account data for that entry. Each of the entries in the local authentication credentials can then be iterated through to determine the account and domain data associated with that entry. The account (e.g., user name or account name) or domain data can be compared to the account or domain data for the user resetting his credentials to determine if there is a stored entry corresponding to that user in the local credentials 452 stored in the cache 450.

If an entry (e.g., blob) associated with the user resetting his credentials is determined it can then be overwritten with a new entry containing the new user credentials as obtained by the local cache writer 426. In one embodiment, a current version of the entry for the user may be placed in memory (e.g., volatile or non-volatile memory) at the device 420 as a working entry for the user. Portions of the working version of the entry may be replaced or altered by local cache writer 426 to create an updated or new version of the entry for the user. Local cache writer can then overwrite the current entry in the local credentials 452 with the new entry such that the update credentials for the user are stored in an entry associated with that user in the local credentials 452 in the cache 450.

Specifically, in the case where the entry takes the form of a blob as described above, new user credentials may include a user or account name and a user password. The password may be hashed using the security component 462 and encrypted using the same encryption function utilized to create the encrypted version of the password stored in the blob (e.g., bytes 96-111). The encrypted version of the old password in the blob for the user can be overwritten with the encrypted version of the new password to create an entry for the user that includes an encrypted version of the new password.

In one embodiment, the new password can then be hashed using security component 462, which may be, for example MSCache2 or the like. Alternatively, the steps of hashing the new password may be performed by the local cache writer 426. In one embodiment, to accomplish this hashing the new user name and password are converted to Unicode. The MD-4 hash can be run on the Unicode password to produce a password byte array. This password byte array is then concatenated with the Unicode user name and the MD-4 hash run on the concatenated set of bits. The Password-Based Key Derivation Function 2 (PBKDF2) can then be run on the hash resulting from the application of the MD-4 to the concatenated set of bits for a number of iterations using the Unicode user name as a salt. The first 16 bytes of the byte array resulting from the application of PBKDF2 is the new hashed password.

Once the hashed new password is obtained, it can be used to overwrite the old password in the new entry for the user (e.g., the working entry in memory associated with the user). Specifically, in one embodiment, bytes 96 through 111 of the blob for the user are overwritten with the new password. The entry or portion thereof may then be encrypted using the encryption algorithm utilized to encrypt the original entry for the user. For example, in one embodiment, bytes 96 through 111 of the blob for the user are encrypted using AES CBC using the NL$KM key and the IV used to decode the original entry.

Once the entry for that user in the local credentials 452 has been overwritten with the new entry containing the user's new credentials, the user may be able to access the device using his newly stored credentials 452 in cache 450. Specifically, the user may attempt to access the device using local authentication component 440 and provide his new credentials in order to attempt such an access. When the local authentication component 440 receives these authentication credentials from the user of the device 420 the local authentication component 440 may determine that it cannot access the domain controller 410, as the domain controller 410 may not be accessible through a public network 470. The local authentication component 440 may then access the locally stored authentication credentials 452 in the local cache 450 associated with the user and validate the user entered authentication credentials against the authentication credentials 452 stored in the local cache 450 for the user.

In particular, the local authentication component 440 may obtain the local authentication credentials 452 associated with the user, process the blob associated with the user to obtain a credential for the user (e.g., the password) and compare the credential for the user to the credential received from the user. As the credential obtained from the entry in the local authentication credentials 452 associated with the user may be the new credential provided by the user during his secure password reset, the user provided credential may match the credential in the entry in the local authentication credentials 452. Accordingly, the user may be granted local access to the device 420. A virtual private network (VPN) can then be established over public network 470 between device 420 and domain controller 410 and an attempt can be made to authenticate with the domain controller 410 using the user's credentials. As the user's credentials have also been reset on the domain controller 410 (e.g., using remote identity manager 406 and domain identity manager 404) the user may be authenticated by the domain controller 410, the device 420 made a member of the domain 400 through the established VPN, and the user allowed to access the domain resources 480 in the domain 400. Additionally, the domain controller 410 may synchronize the locally stored credentials 452 for that user at the device 420 if needed.

Figure 5:
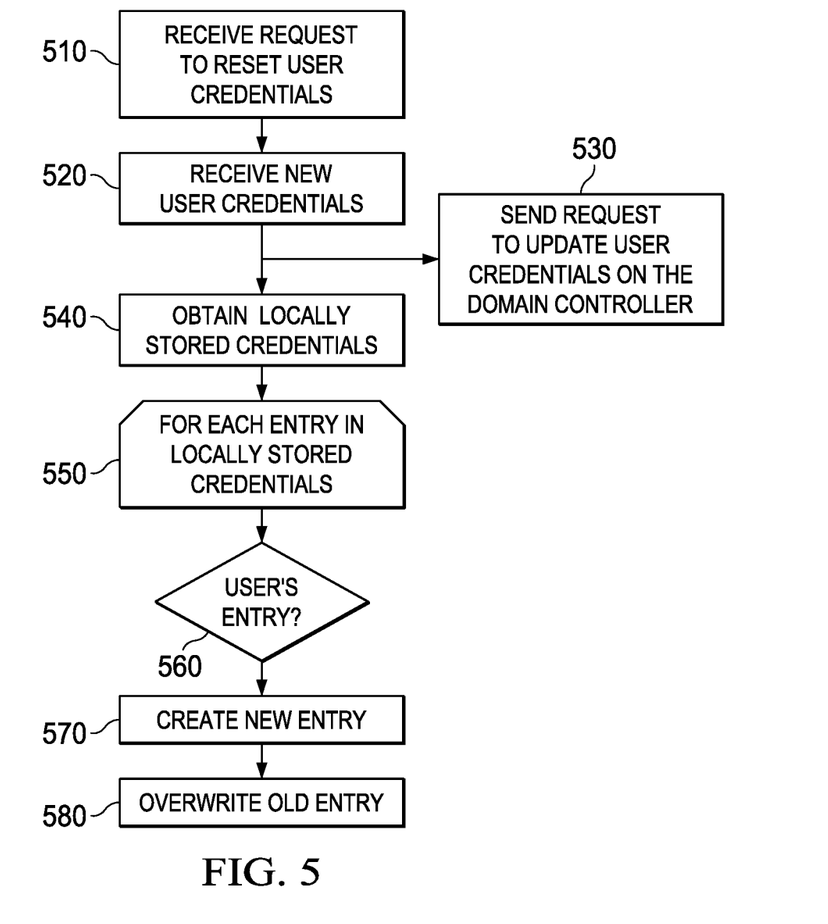
FIG. 5 is a flow diagram illustrating one embodiment of a method for resetting locally stored authentication credentials.

Referring now to FIG. 5, one embodiment of a method that may be employed to reset a user's domain credentials on a device without communicating with a domain controller is depicted. When a user affiliated with a domain is given a computing device, a set of authentication credentials (e.g., username or password) are provisioned by a network administrator of the domain for the user or device. A set of identity verification data (e.g., a challenge and response) for use in verifying a user may also be obtained for the user. Additionally, a local identity manager may be installed on the user's device. This local identity manager may have been given SYSTEM or administrator level access to the device such that the local identity manger may access the registry of the operating system on the device. The local identity management component may include self-service password reset functionality and be configured to send requests associated with the self-service password reset functionality such that the user's credentials may be reset with respect to the domain controller. For example, the local identity management component may be a plug-in configured to utilize, interact with, or replace in whole or in part, a Graphical Identification and Authentication (GINA) dynamic-link library (DLL).

In cases where a user has forgotten his credentials (or the credential is otherwise not valid), the local identity management component may allow the user to access an interface to reset his credentials. Such an interface may be presented using, for example, a secure browser (which may have a restricted set of functionality compared to a typical web browser) when a user requests credential reset functionality from a login screen or the like at step 510. Accordingly, at step 520, the user's new credentials may be received. One or more requests to reset the user's credentials with respect to the domain controller may be sent at step 530. For example, a remote identity manager may be contacted over a network and a credential reset for the user of the device requested. The new credentials can be sent to the remote identity manager, which may effectuate the reset of the user's credentials on the domain controller.

The user's new credentials can be obtained orthogonally to the credential reset functionality with respect to the domain controller via an integration (e.g., as a plug-in) with the browser provided to accomplish credential functionality with respect to the domain controller. Thus, communications for resetting the user credentials between the device the domain controller credential reset interface may be observed to obtain the new user credentials from these communications. In another embodiment, during the credential reset process a cookie with the new user's credentials may be set on the user's device using the provided browser functionality. This cookie may be read to obtain the new user credentials.

At step 540 the authentication credentials stored locally on the device are obtained. These authentication credentials may be stored in a local cache such as the registry of the operating system of the device and include a set of entries corresponding to users of the device. Each entry may be associated with a user and a domain. For example, the Windows operating system stores cached domain credential information in the HKLM\Security\Cache registry. These locally stored authentication credentials may only be visible to processes running with SYSTEM level credentials. The local authentication credentials may contain multiple entries (e.g., for example 10 in certain cases) where each entry may pertain to a different user who has accessed a domain using their credentials from the device. As discussed, in some instances the authentication credentials are stored in an entry or blob.

In particular, each blob may contain an encrypted version of a user's credential (e.g., password) after processing by a security component. For example, the blob for a user may contain an encrypted version of a 16 byte hash value created by the MSCache2 procedure as applied to the user's password in a Windows environment. In one particular embodiment the blob may take the following format, where information in brackets comprises a number describing the byte index or range of the blob followed by a description of the data contained in those bytes: [0 userNameLength][2 domainNameLength][4 effectiveNameLength][6 fullNameLength][8 logonScriptLength][10 profilePathLength][12 homeDirectoryLength][14 homeDirectoryDriveLength][16 . . . 23 last login/unknown][24 . . . 27 groupCount][28 logonDomainNameLength][29 . . . 59 unknown][60 dnsDomainNameLength][62 upnLength][64 . . . 79 AES CBC IV][80 . . . 95 Checksum][96 . . . 111 encrypted 16 byte MSCache2 password hash][112 . . . n rest of encrypted domain data with positions derived from header values].

In the above embodiment of a blob, bytes 96 through the length of the blob are the encrypted data that contain the user's password and other account information such as the domain data or other account credentials such as the user (or account) name. The data may be encrypted with Advanced Encryption Standard (AES) Cipher Block Chaining (CBC) cipher where the Initialization Vector (IV) is from the header and the key is the first 16 bytes of a cache key such as NL$KM in Windows. The first 16 bytes of the decrypted data is the hash of a user's password as created by the MSCache2 security component. The rest of the information can be derived using the offsets described in the blob header starting from position 72 in the byte array of the blob.

The entries in the cache of locally stored authentication credentials can then be iterated through at step 550 until an entry associated with the user is determined (if one exists) at step 560. In order to determine an entry of the locally stored credentials associated with a user, a cache key used to encrypt the data contained in the entry may be determined. This key may be, or may be derived from, a system (e.g., operating system) key or a local security related key. For example, in one embodiment, a Windows System key (e.g., syskey) used by the Windows operating system to protect secure information stored locally on the device may be obtained. This key may be a 128-bit Rivest Cipher 4 (RC4) encryption key. This system key may be derived by using key metadata from the following keys: SYSTEM\\CurrentControlSet\\Control\\Lsa","JD"; SYSTEM\\CurrentControlSet\\Control\\Lsa","Skew1"; SYSTEM\\CurrentControlSet\\Control\\Lsa","GBG"; and SYSTEM\\CurrentControlSet\\Control\\Lsa","Data".

A local security authority key may also be obtained. This key may be a key used to protect a process for domain authentication. For example, in one embodiment, with respect to the Windows operating system a Local Security Authority (LSA) key used to protect the lsass.exe process may be obtained. In one embodiment, the LSA key may be obtained by reading the SECURITY\\Policy\\PolEKList registry value. Bytes 60 through total length −60 of this registry value can be read to obtain ciphered data. Bytes 28 through total length −28 of this ciphered data can be read to obtain a ciphered hash. A cipher key can be generated by generating a Secure Hash Algorithm (SHA) 256 bit hash using the obtained system key as an initialization value and applying one or more iterations of the SHA 256 transform. The ciphered data can be decrypted with AES Electronic Code Book (ECB) using the generated cipher key. The 32 bytes starting from the $68^{th}$ byte of the array resulting from this decryption is the LSA key.

The cache key used to encrypt the user credentials in the entries in the local authentication credentials can then be derived using the system key and the local security authority key. In one embodiment, the cache key (e.g., NL$KM) may be obtained by reading the SECURITY\\Policy\\Secrets\\NL$KM\\CurrVal registry value. Bytes 60 through total length −60 of this registry value can be read to obtain ciphered data. Bytes 28 through total length −28 of this ciphered data can be read to obtain a ciphered hash. A cipher key can be generated by generating a Secure Hash Algorithm (SHA) 256 bit hash using the obtained local security authority key as an initialization value and applying one or more iterations of the SHA 256 transform. The ciphered data can be decrypted with AES Electronic Code Book (ECB) using the generated cipher key. The 64 bytes starting from the $16^{th}$ byte of the array resulting from this decryption is the NL$KM key.

Once the cache key is determined, it can be used to decrypt the entries (e.g., blobs), or portions thereof, such as the encrypted password hash or encrypted domain or account data. In one embodiment, for example, bytes 96 onward of an entry in local credentials of the cache may be decrypted to obtain domain or account data for that entry. The account (e.g., user name or account name) or domain data of the entry can be compared to the account or domain data for the user resetting his credentials to determine if that entry is associated with the user at step 560.

If an entry (e.g., blob) associated with the user resetting his credentials is determined at step 560, a new entry containing the new user credentials may be created for the user at step 570. Specifically, in one embodiment, a current version of the entry for the user may be placed in memory (e.g., volatile or non-volatile memory) at the device as the new entry for the user. Portions of this new entry may be replaced or altered to create the new entry for the user. The current entry in the local credentials for the user can then be overwritten with the new entry at step 580 such that the update credentials for the user are stored in an entry associated with that user in the local credentials in the cache.

Specifically, in the case where the entry takes the form of a blob as described above, the new user credentials may include a user or account name and a user password. The password may be hashed using a security component or encrypted using the same encryption function utilized to create the encrypted version of the password stored in the blob (e.g., bytes 96-111). The encrypted version of the old password in the blob for the user (e.g., the new version as stored in memory) can be overwritten with the encrypted version of the new password to create the new entry for the user that includes an encrypted version of the new password.

In one embodiment, the new password can then be hashed using a security component, which may be, for example MSCache2 or the like. In one embodiment, to accomplish this hashing the new user name and password are converted to Unicode. The MD-4 hash can be run on the Unicode password to produce a password byte array. This password byte array is then concatenated with the Unicode user name and the MD-4 hash run on the concatenated set of bits. The Password-Based Key Derivation Function 2 (PBKDF2) can then be run on the hash resulting from the application of the MD-4 to the concatenated set of bits for a number of iterations using the Unicode user name as a salt. The first 16 bytes of the byte array resulting from the application of PBKDF2 is the new hashed password.

Once the hashed new password is obtained, it can be used to overwrite the old password in the new entry for the user. Specifically, in one embodiment, bytes 96 through 111 of the blob for the user are overwritten with the new password. The entry, or portion thereof, may then be encrypted using the encryption algorithm utilized to encrypt the original entry for the user. For example, in one embodiment, bytes 96 through 111 of the blob for the user are encrypted using AES CBC using the NL$KM key and the IV used to decode the original entry.

Once the entry for that user in the local credentials in the cache has been overwritten with the new entry containing the user's new credentials, the user may be able to access the device using the entry in the cache. Specifically, the user may attempt to access the device using a local authentication component and provide his new credentials in order to attempt such an access. When the local authentication component receives these authentication credentials from the user of the device the local authentication component may determine that it cannot access the domain controller, as the domain controller may not be accessible through a public network. The local authentication component may then access the locally stored authentication credentials in the local cache associated with the user and validate the user entered authentication credentials against the authentication credentials stored in the local cache for the user.

In particular, the local authentication component may obtain the local authentication credentials associated with the user, process the blob associated with the user to obtain a credential for the user (e.g., the password) and compare the credential for the user to the credential received from the user. As the credential obtained from the entry in the local authentication credentials associated with the user may be the new credential provided by the user during his secure password reset, the user provided credential may match the credential in the entry in the local authentication credentials. Accordingly, the user may be granted local access to the device. A virtual private network (VPN) can then be established over a public network between the device and the domain controller and an attempt can be made to authenticate with the domain controller using the user's credentials. As the user's credentials have also been reset on the domain controller (e.g., via a request sent to an identity manager or other service provider) the user may be authenticated by the domain controller, the device made a member of the domain through the established VPN, and the user allowed to access the domain resources in the domain. Additionally, the domain controller may synchronize the locally stored credentials for that user at the device if needed.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Read-Only Memories (ROMs), Random Access Memories (RAMs), and Hard Drives (HDs) are computer memories for storing computer-executable instructions executable by a central processing unit (CPU) or capable of being compiled or interpreted to be executable by the CPU. Suitable computer-executable instructions may reside on a computer readable medium (e.g., a ROM, a RAM, and/or a HD), hardware circuitry or the like, or any combination thereof. Within this disclosure, the term "computer readable medium" is not limited to ROMs, RAMs, and HDs and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such a process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The scope of the present disclosure should be determined by the following claims and their legal equivalents.

What is claimed is:

1. A system, comprising:
  a computer device, including:
    a processor;
    a data store comprising locally stored authentication credentials, wherein the locally stored authentication credentials include one or more entries created in association with a domain controller communicating with the computer device over a network using a private interface provided by an operating system of the computer device to the domain controller;
    and a non-transitory computer readable medium storing instructions executable by the processor for:
      obtaining a user credential at the computer device without contacting the domain controller over the network;
      accessing the locally stored authentication credentials to determine a current entry in the locally stored authentication credentials associated with the user credential, wherein accessing the locally stored authentication credentials comprises circumventing the private interface provided by the operating system to the domain controller by directly accessing a registry of the operating system of the computer device that includes the locally stored authentication credentials;

creating a new entry associated with the user credential without contacting the domain controller over the network, wherein the new entry includes the obtained user credential; and overwriting the current entry in the locally stored authentication credentials with the new entry without contacting the domain controller over the network, wherein by overwriting the current entry with the new entry a user can be authenticated as a user of a domain at the computer device using the user credential in the new entry of the locally stored authentication credentials without contacting the domain controller over the network.

2. The system of claim 1, wherein the obtaining, accessing, creating and overwriting are done without allowing the user to access the computer device.

3. The system of claim 1, wherein a previous user credential is in an encrypted format in the current entry and the user credential is in the encrypted format in the new entry.

4. The system of claim 3, wherein the one or more keys are used to encrypt the user credential in the new entry.

5. The system of claim 4, wherein the instructions are further executable for determining the one or more keys and decrypting the entry of the locally stored authentication credentials to determine if the entry is associated with the user based on the one or more keys.

6. The system of claim 1, wherein the instructions are further executable for sending a request to update the user's credentials at the domain controller with the user credential.

7. The system of claim 6, wherein the user credential is obtained from the request to update the user's credentials at the domain controller.

8. A non-transitory computer readable medium storing instructions executable by a processor to perform:

obtaining a user credential at the device without contacting a domain controller over the network;

accessing a data store comprising locally stored authentication credentials to determine a current entry in the locally stored authentication credentials associated with the user credential, wherein the locally stored authentication credentials include one or more entries created in association with the domain controller communicating with the device over a network using a private interface provided by an operating system of the computer device to the domain controller and wherein accessing the locally stored authentication credentials comprises circumventing the private interface provided by the operating system to the domain controller by directly accessing a registry of the operating system of the computer device that includes the locally stored authentication credentials;

creating a new entry associated with the user credential without contacting the domain controller over the network, wherein the new entry includes the obtained user credential; and overwriting the current entry in the locally stored authentication credentials with the new entry without contacting the domain controller over the network, wherein by overwriting the current entry with the new entry a user can be authenticated as a user of a domain at the device using the user credential in the new entry of the locally stored authentication credentials without contacting the domain controller over the network.

9. The non-transitory computer readable medium of claim 8, wherein the obtaining, accessing, creating and overwriting are done without allowing the user to access the computer device.

10. The non-transitory computer readable medium of claim 8, wherein a previous user credential is in an encrypted format in the current entry and the user credential is in the encrypted format in the new entry.

11. The non-transitory computer readable medium of claim 10, wherein the one or more keys are used to encrypt the user credential in the new entry.

12. The non-transitory computer readable medium of claim 11, wherein the instructions are further executable for determining the one or more keys and decrypting the entry of the locally stored authentication credentials to determine if the entry is associated with the user based on the one or more keys.

13. The non-transitory computer readable medium of claim 8, wherein the instructions are further executable for sending a request to update the user's credentials at the domain controller with the user credential.

14. The non-transitory computer readable medium of claim 13, wherein the user credential is obtained from the request to update the user's credentials at the domain controller.

15. A method, comprising:

obtaining a user credential at the device without contacting a domain controller over the network;

accessing a data store comprising locally stored authentication credentials to determine a current entry in the locally stored authentication credentials associated with the user credential, wherein the locally stored authentication credentials include one or more entries created in association with the domain controller communicating with the device over a network using a private interface provided by an operating system of the computer device to the domain controller and wherein accessing the locally stored authentication credentials comprises circumventing the private interface provided by the operating system to the domain controller by directly accessing a registry of the operating system of the computer device that includes the locally stored authentication credentials;

creating a new entry associated with the user credential without contacting the domain controller over the network, wherein the new entry includes the obtained user credential; and overwriting the current entry in the locally stored authentication credentials with the new entry without contacting the domain controller over the network, wherein by overwriting the current entry with the new entry a user can be authenticated as a user of a domain at the device using the user credential in the new entry of the locally stored authentication credentials without contacting the domain controller over the network.

16. The method of claim 15, wherein the obtaining, accessing, creating and overwriting are done without allowing the user to access the computer device.

17. The method of claim 15, wherein a previous user credential is in an encrypted format in the current entry and the user credential is in the encrypted format in the new entry.

18. The method of claim 17, wherein the one or more keys are used to encrypt the user credential in the new entry.

19. The method of claim 18, further comprising determining the one or more keys and decrypting the entry of the locally stored authentication credentials to determine if the entry is associated with the user based on the one or more keys.

20. The method of claim 15, further comprising sending a request to update the user's credentials at the domain controller with the user credential.

21. The method of claim 20, wherein the user credential is obtained from the request to update the user's credentials at the domain controller.

* * * * *